W. L. SNYDER.
SEPARATOR.
APPLICATION FILED MAY 7, 1909.
960,725.
Patented June 7, 1910.
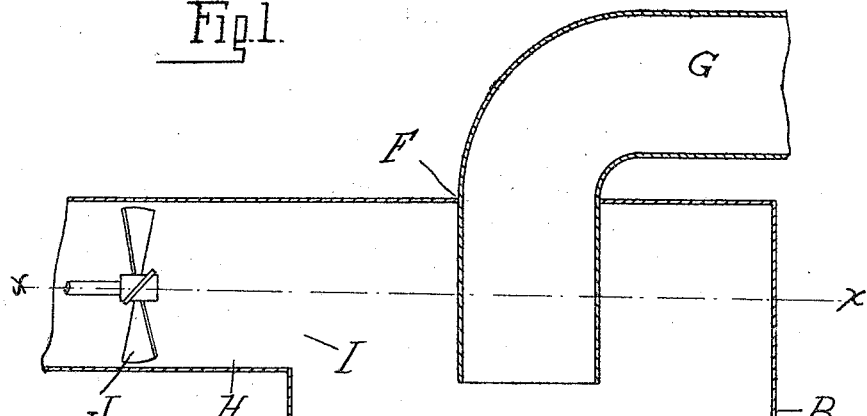
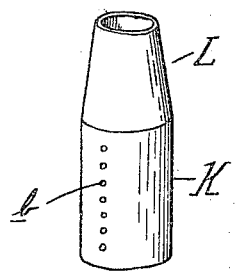
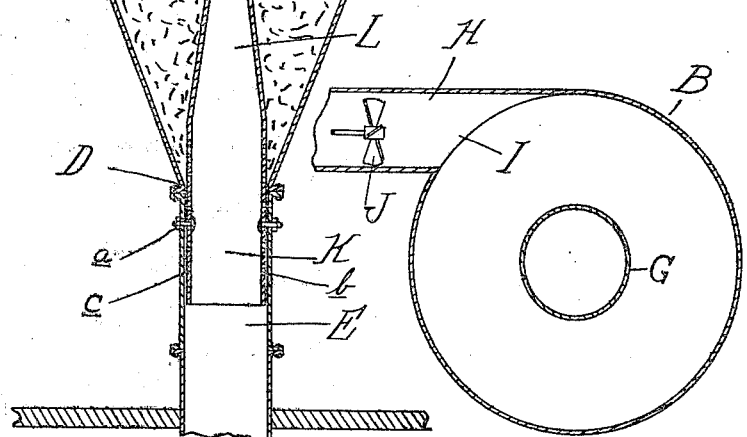
Witnesses
Inventor
William L. Snyder
By Whittemore, Hulbert & Whittemore
Attys

UNITED STATES PATENT OFFICE.

WILLIAM L. SNYDER, OF DETROIT, MICHIGAN, ASSIGNOR TO THE AMERICAN AGRICULTURAL CHEMICAL COMPANY, OF NEW YORK, N. Y., A CORPORATION OF CONNECTICUT.

SEPARATOR.

960,725. Specification of Letters Patent. Patented June 7, 1910.

Application filed May 7, 1909. Serial No. 494,669.

*To all whom it may concern:*

Be it known that I, WILLIAM L. SNYDER, a citizen of the United States of America, residing at Detroit, in the county of Wayne and State of Michigan, have invented certain new and useful Improvements in Separators, of which the following is a specification, reference being had therein to the accompanying drawings.

The invention relates particularly to centrifugal separators, and has for its primary object the production of a device of this character capable of effecting in a simple and inexpensive manner the separation of fine ground material, such as paint pigments, in grades of any desired degree of fineness; and, with this object in view, the invention consists in the novel construction of the separator mechanism, in the peculiar arrangement and combination of parts, and in various details of construction, as will be more fully hereinafter set forth and claimed.

For the purpose of illustration, I have shown the invention embodied in a centrifugal separator of the well-known "Cyclone" type, this being a simple and the preferred form of mechanism, but I do not desire to be limited to this particular form of structure, as other types may as well be employed.

In the drawings illustrating the invention, Figure 1 is a vertical central section through a Cyclone separator embodying my invention; Fig. 2 is a detached perspective view of the adjustable member; and Fig. 3 is a section taken on line *x—x* of Fig. 1.

In the drawings thus briefly described, A designates the usual Cyclone separator casing, formed with a cylindrical section B at its upper end and a tapering conical lower section C terminating in a discharge opening or outlet D.

E represents the usual discharge pipe communicating with the discharge opening through which the coarse material is conveyed.

Within the top of the separator casing is formed the usual outlet opening F.

G is the conveyer pipe or conduit through which the fine material is discharged, extending within the opening F and for a distance within the casing interior as shown.

H represents the ordinary blast conduit, communicating with a tangential inlet I formed in the casing side near its top, and J is a blast fan arranged within the conduit H.

The operation of the separator as described is well known, the material being fed within the separator casing through the blast conduit and the current passing spirally within the casing. The fine particles are discharged through the upper conveyer pipe G, while the coarses material drops through the opening D and is conveyed by the discharge pipe E to any desired point.

In the form of separator described, it will be obvious that only one grade of material will be taken off. It is the primary object of the invention to provide means for varying the grade, so that material of any degree of fineness may be obtained from the separator if desired. With this end in view, I have provided means for varying the position of one of the casing outlets, preferably in the Cyclone type of separator the lower outlet or discharge opening within the conical portion of the separator casing. In practice, I find that the raising of the outlet described or the projecting of the same upwardly within the casing has the effect of causing coarser material and a greater volume to pass through the conveyer conduit G, with a correspondingly lesser amount of material through the lower discharge pipe E. Conversely, if a finer mesh is desired to be taken off, this result is obtained by lowering the outlet opening the desired amount.

More particularly, the mechanism for accomplishing the results described is as follows: Within the discharge opening D at the lower end of the separator casing I arrange a tubular member K of a length to extend upwardly within the separator cone and downwardly a considerable distance to have a telescopic engagement with the discharge pipe E. I also preferably taper the upper end of this tubular member, as indicated at L, which permits the tube to be more easily removed from the material that packs around it in the operation of the separator. The upper end of the tubular member described constitutes the outlet for the separator cone, and the raising or lowering of the member shifts the position of the outlet in the desired manner. Any means may be employed for holding the shiftable tube in its various positions of adjustment, and I have here shown as the preferable devices bolts $a$ engaging registering openings $b$ $c$ formed within the adjustable tube and the discharge pipe, as plainly indicated. As the material to be separated is forced by the fan through the casing, the coarse material fills in behind the tubular member until it is filled to its top, in the manner indicated by the reference-letter $c'$. The material then overflows, falling within the tube and discharging out of the pipe E in the usual manner. It will be seen that the filling or packing of the material below the mouth of the tubular member decreases the size of the cone, the latter being shortened as the tube is adjusted upwardly within the casing. This variation in the size of the casing produces the desired results as before pointed out, the raising and lowering of the tube causing coarser and finer material to be taken off from the separator. Thus, by a proper adjustment of the tube and the consequent shifting of the outlet, any desired mesh may be taken off from the separator.

What I claim as my invention is,—

1. In a Cyclone separator, the combination of the casing, provided with a tangential air inlet, an outlet at its upper end, and formed with a lower conical section or portion terminating in a discharge conduit, and an upwardly projecting tubular member within the conical section having a telescopic engagement with the discharge conduit.

2. In a Cyclone separator, the combination with a casing formed with an outlet at one end and a tapering or conical section at the opposite end terminating in a material discharge opening, and means within the tapered section for changing the operative length of the casing to vary the grade of material discharged through the outlet.

3. In a Cyclone separator, the combination of the conical section of the casing terminating in a discharge opening, and a tubular member surrounding said opening adapted to retain a quantity of material between the same and the wall of the tapering section.

4. In a Cyclone separator, the combination of the conical section of a casing terminating in a discharge opening, and an adjustable tubular member surrounding said opening adapted to retain a variable amount of material between the same and the wall of the tapered section.

5. In a Cyclone separator, the combination of the conical section of a casing terminating in a discharge opening and an axially adjustable member fitted within the opening adapted to retain a variable amount of material between the same and the wall of the conical section.

6. In a centrifugal separator, the combination with a separator casing provided with an outlet at one end and a tapering section at the opposite end having a material discharge opening, and means for changing the operative length of the tapering section to vary the grade of material discharging through the outlet.

In testimony whereof I affix my signature in presence of two witnesses.

WILLIAM L. SNYDER.

Witnesses:
 FRED KEE,
 J. C. O'LEARY.